UNITED STATES PATENT OFFICE.

VLADIMIR STANĚK, OF PRAGUE, AUSTRIA-HUNGARY, ASSIGNOR TO CHEMISCHE FABRIK GEDEON RICHTER, OF BUDAPEST, AUSTRIA-HUNGARY.

PROCESS OF MAKING STABLE COMPOUNDS CONTAINING HYDROGEN PEROXID.

1,035,756. Specification of Letters Patent. Patented Aug. 13, 1912.

No Drawing. Application filed July 6, 1911. Serial No. 637,176.

*To all whom it may concern:*

Be it known that I, VLADIMIR STANĚK, a subject of the Emperor of Austria-Hungary, residing at Prague, Bohemia, Austria-Hungary, have invented certain new and useful Improvements in Processes of Making Stable Compounds Containing Hydrogen Peroxid, of which the following is a specification.

Tanatar has found that various organic substances combine with hydrogen peroxid forming solid compounds. Such compounds can be formed with urea, acetamid, urethane, succinamid, asparagin, mannite, erythrite, pinacone and betain. All those compounds behave in aqueous solution similar to hydrogen peroxid. Unfortunately, they also decompose very quickly and for that reason their application in practice is altogether out of the question because after a very short time they split up to form water and oxygen.

I have found that by the addition of small quantities of organic or inorganic acids those compounds become very stable and for that reason are very useful for practical application. For the preparation of a stable compound with a high percentage of hydrogen peroxid the urea has proved specially suitable. If urea be treated with a solution of hydrogen peroxid containing 30% $H_2O_2$ on cooling the solution a compound crystallizes out that has a composition according to the formula:

$$CO(NH_2)_2 H_2O_2.$$ 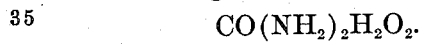

That unstable compound becomes very stable by the addition of a small amount of an acid. For instance, I have found that the addition of 0.1 per cent. of citric acid or of 0.2 per cent. of tannic acid or 0.5 per cent. of boric acid is quite sufficient to make the compound stable and keepable for a long time, say 6 months and even longer.

The compound of urea with hydrogen peroxid contains 34 to 35 per cent. $H_2O_2$ (the theory requires 36 per cent.) and is very easily soluble in water. The aqueous solution behaves exactly like a solution of hydrogen peroxid with the exception that by the addition of the substances mentioned above for rendering the compound stable, the easy decomposibility of the hydrogen peroxid is completely removed.

Hydrogen peroxid in a solid form has been introduced into the market for some time, say as perborates, persulfates and the like. In all those cases the compounds do not contain more than 10 to 11 per cent. of hydrogen peroxid whereas the compounds with the organic substances mentioned above and made stable according to the present invention, contain about 35 per cent. of hydrogen peroxid. A hydrogen peroxid of such high concentration and in a solid and stable form has not been known before. By dissolving the preparation a solution of hydrogen peroxid can be readily made at any time and it is evident that the facility with which the same may be shipped from place to place, the high concentration of the substance and the length of time it may be preserved open quite new ways for the general application of hydrogen peroxid.

Example I: 450 gr. of pulverized urea are introduced in 1000 gr. of an aqueous solution of hydrogen peroxid of 30% $H_2O_2$ while the mass is vehemently stirred. The mixture is then cooled down to freezing point and the crystalline mass obtained is freed from water by suction and afterward intimately mixed with 0.7% of dry citric acid or 0.5% of dry boric acid in the form of a powder. The crystalline mixture is finally dried at a temperature of 30 to 40° C. The hydrogen peroxid-urea compound has the formula $$CO(NH_2)_2.H_2O_2$$ 

and forms a white crystalline powder, easily soluble in water and can be recrystallized from alcohol without decomposition.

Example II: 450 gr. of urea and 1000 gr. of hydrogen peroxid are treated as mentioned above. The compound contained is intimately mixed with 0.2% of salicylic acid previously dissolved in a little alcohol.

Example III: The compound of urea and hydrogen peroxid prepared in the manner described above is mixed with 0.2% of dry tannic acid and dried.

Example IV. 1130 gr. of betain are introduced in an aqueous solution of 1400 gr. of hydrogen peroxid of 30% $H_2O_2$. The solution is weakly acidified and evaporated at a low temperature *in vacuo* until crystallization sets in. The crystallized compound is separated from the mother liquor, dried, and made stable by mixing it with 0.2% of dry citric acid.

The compound of betain with hydrogen peroxid forms a white crystalline powder, easily soluble in water and has the formula $$C_5H_{11}NO_2 \cdot H_2O_2.$$

What I claim is:

1. A process of rendering unstable solid compounds of hydrogen peroxid with organic substances stable which consists in mixing therewith a small quantity of an acid.

2. The process herein described of producing a stable compound of hydrogen peroxid and urea, which comprises dissolving urea in hydrogen peroxid in excess and adding a small quantity of a substance having an acid reaction.

3. The herein described stable compound of urea and hydrogen peroxid containing some substance having an acid reaction.

In testimony whereof I affix my signature in presence of two witnesses.

VLADIMIR STANĚK.

Witnesses:
 FERDINAND SCHULZ,
 FARORLOW MULLBAUER.